US008725645B1

(12) United States Patent
Montini et al.

(10) Patent No.: US 8,725,645 B1
(45) Date of Patent: May 13, 2014

(54) NON-INVASIVE METERING SYSTEM FOR SOFTWARE LICENSES

(71) Applicant: Cetrus LLC, San Ramon, CA (US)

(72) Inventors: Cory A. Montini, Walnut Creek, CA (US); Uri Eliahu, San Ramon, CA (US); David E. Lieberman, Tracy, CA (US); Christopher Gabel, Fremont, CA (US)

(73) Assignee: Cetrus LLC, San Ramon, CA (US)

( * ) Notice: Subject to any disclaimer, the term of this patent is extended or adjusted under 35 U.S.C. 154(b) by 0 days.

(21) Appl. No.: 13/766,718

(22) Filed: Feb. 13, 2013

Related U.S. Application Data

(60) Provisional application No. 61/749,221, filed on Jan. 4, 2013.

(51) Int. Cl.
*G06F 21/10* (2013.01)

(52) U.S. Cl.
USPC ............ 705/52; 705/50; 705/51; 717/100; 717/104; 717/168; 717/174

(58) Field of Classification Search
USPC ......... 717/104, 120, 174, 178; 705/50–52, 59
See application file for complete search history.

(56) References Cited

U.S. PATENT DOCUMENTS

| 5,274,794 | A |   | 12/1993 | Ewing et al. |
|---|---|---|---|---|
| 5,386,369 | A |   | 1/1995 | Christiano |
| 5,388,211 | A | * | 2/1995 | Hornbuckle ................ 717/178 |
| 5,390,297 | A |   | 2/1995 | Barber et al. |
| 5,671,412 | A |   | 9/1997 | Christiano |
| 5,778,367 | A |   | 7/1998 | Wesinger, Jr. et al. |
| 5,790,664 | A |   | 8/1998 | Coley et al. |
| 5,826,014 | A |   | 10/1998 | Coley et al. |
| 5,831,609 | A |   | 11/1998 | London et al. |
| 5,870,550 | A |   | 2/1999 | Wesinger, Jr. et al. |
| 5,898,830 | A |   | 4/1999 | Wesinger, Jr. et al. |
| 6,268,789 | B1 | * | 7/2001 | Diamant et al. ............ 340/5.74 |

(Continued)

FOREIGN PATENT DOCUMENTS

WO     WO 95/34857     12/1995

OTHER PUBLICATIONS

Jiang, B. et al., "Software Licensing: Pay-Per-Use versus Perpetual," Nov. 2007, thirty-four pages, Tepper School of Business, Carnegie Mellon University, Pittsburgh, PA, USA.

(Continued)

*Primary Examiner* — Mamon Obeid
(74) *Attorney, Agent, or Firm* — Fenwick & West LLP

(57) ABSTRACT

A non-invasive metering system enables on-demand, metered usage licensing of software applications. A packaging module generates a secure application package for an original, unmodified application authored by a software publisher. The software publisher need not directly modify the code of the original application. Rather, the packaging module includes, within the secure application package but separate from the code of the application itself, a shell application that controls runtime aspects of the application, such as metering of the application. The secure application package is made available to users wishing to use the application on a metered basis. When users use the secure application package, a specialized loader process extracts from the secure application package executable code for the application and for the shell application, and executes the shell application, which in turn authenticates the user and executes the application the using the executable code extracted from the secure application package.

20 Claims, 20 Drawing Sheets

(56) References Cited

U.S. PATENT DOCUMENTS

| | | |
|---|---|---|
| 6,324,538 B1 | 11/2001 | Wesinger, Jr. et al. |
| 6,484,182 B1 * | 11/2002 | Dunphy et al. ............... 700/231 |
| 6,658,568 B1 | 12/2003 | Ginter et al. |
| 6,675,153 B1 | 1/2004 | Cook et al. |
| 6,683,546 B1 | 1/2004 | Torrubia-Saez |
| 6,732,101 B1 | 5/2004 | Cook |
| 6,760,752 B1 | 7/2004 | Liu et al. |
| 6,850,940 B2 | 2/2005 | Wesinger, Jr. et al. |
| 6,853,987 B1 | 2/2005 | Cook |
| 6,880,149 B2 | 4/2005 | Cronce |
| 6,918,113 B2 | 7/2005 | Patel et al. |
| 6,920,567 B1 * | 7/2005 | Doherty et al. ................ 726/22 |
| 6,959,320 B2 | 10/2005 | Shah et al. |
| 6,966,002 B1 | 11/2005 | Torrubia-Saez |
| 7,028,336 B2 | 4/2006 | Wesinger, Jr. et al. |
| 7,043,524 B2 | 5/2006 | Shah et al. |
| 7,062,567 B2 | 6/2006 | Benitez et al. |
| 7,136,841 B2 | 11/2006 | Cook |
| 7,165,174 B1 | 1/2007 | Ginter et al. |
| 7,231,360 B2 | 6/2007 | Sy |
| 7,353,204 B2 | 4/2008 | Liu |
| 7,360,252 B1 | 4/2008 | Torrubia-Saez |
| 7,395,244 B1 * | 7/2008 | Kingsford .................... 705/52 |
| 7,475,256 B2 | 1/2009 | Cook |
| 7,484,245 B1 * | 1/2009 | Friedman et al. .............. 726/27 |
| 7,523,071 B2 * | 4/2009 | Fox et al. ........................ 705/52 |
| 7,539,725 B2 | 5/2009 | Nutkis |
| 7,574,607 B1 | 8/2009 | Liu et al. |
| 7,600,251 B2 * | 10/2009 | Gatto et al. ..................... 726/1 |
| 7,716,474 B2 * | 5/2010 | Eriksson et al. ............. 713/165 |
| 7,849,017 B2 | 12/2010 | Znidarsic |
| 8,230,237 B2 * | 7/2012 | Yao et al. ...................... 713/300 |
| 8,595,841 B2 * | 11/2013 | Britton et al. .................. 726/24 |
| 2003/0004882 A1 | 1/2003 | Holler et al. |
| 2003/0163808 A1 * | 8/2003 | Cordova ........................ 717/176 |
| 2004/0123129 A1 | 6/2004 | Ginter et al. |
| 2004/0167859 A1 | 8/2004 | Mirabella |
| 2005/0132347 A1 | 6/2005 | Harper et al. |
| 2005/0165693 A1 | 7/2005 | Moritzen |
| 2005/0289072 A1 | 12/2005 | Sabharwal |
| 2006/0031686 A1 * | 2/2006 | Atallah et al. ................ 713/190 |
| 2006/0248017 A1 | 11/2006 | Koka et al. |
| 2006/0253554 A1 | 11/2006 | Uwais |
| 2007/0033395 A1 | 2/2007 | MacLean |
| 2007/0256064 A1 | 11/2007 | Torrubia et al. |
| 2007/0256138 A1 | 11/2007 | Gadea et al. |
| 2007/0276759 A1 | 11/2007 | Ginter et al. |
| 2008/0005732 A1 | 1/2008 | Coon |
| 2008/0071689 A1 * | 3/2008 | Tabet ............................. 705/59 |
| 2008/0086777 A1 | 4/2008 | Sanchez |
| 2008/0109876 A1 * | 5/2008 | Hitomi et al. .................... 726/2 |
| 2008/0178298 A1 | 7/2008 | Arai et al. |
| 2008/0215468 A1 * | 9/2008 | Monsa-Chermon et al. ... 705/34 |
| 2008/0228644 A1 * | 9/2008 | Birkestrand et al. ............ 705/40 |
| 2009/0119458 A1 | 5/2009 | de Vries et al. |
| 2009/0119644 A1 | 5/2009 | de Vries et al. |
| 2010/0121990 A1 | 5/2010 | Koka et al. |
| 2011/0047624 A1 | 2/2011 | Vedantam et al. |
| 2011/0072522 A1 | 3/2011 | Koka et al. |

OTHER PUBLICATIONS

United States Patent and Trademark Office, Final Rejection, U.S. Appl. No. 12/718,560, May 3, 2013, 9 Pages.

United States Patent and Trademark Office, Non-final Rejection, U.S. Appl. No. 12/718,560, Nov. 20, 2012, 12 Pages.

United States Patent and Trademark Office, Final Rejection, U.S. Appl. No. 12/718,560, Mar. 22, 2012, 12 Pages.

United States Patent and Trademark Office, Non-final Rejection, U.S. Appl. No. 12/718,560, Oct. 24, 2011, 16 Pages.

* cited by examiner

| Id | Application Name | Application Category | Published to Catalog[1] | Usage Enabled[2] | | |
|---|---|---|---|---|---|---|
| 36 | VB.NetDemo | Demonstration Software | ☑ | ☑ | Secure Wrap | deactivate |
| 37 | Delphi Demo | Demonstration Software | ☑ | ☑ | Secure Wrap | deactivate |
| 38 | VB6 Demo | Demonstration Software | ☑ | ☑ | Secure Wrap | deactivate |
| 39 | C++ Demo | Demonstration Software | ☑ | ☑ | Secure Wrap | deactivate |
| 40 | CSharp Demo | Demonstration Software | ☑ | ☑ | Secure Wrap | deactivate |
| 41 | Fortran Demo | Demonstration Software | ☑ | ☑ | Secure Wrap | deactivate |
| 45 | C++.NET demo | Demonstration Software | ☑ | ☑ | Secure Wrap | deactivate |
| 93 | VBA Demo | Demonstration Software | ☑ | ☑ | Secure Wrap | deactivate |
| 135 | FoxPro Demo | Demonstration Software | ☑ | ☑ | Secure Wrap | deactivate |
| 153 | C++Dialog | Demonstration Software | ☑ | ☑ | Secure Wrap | deactivate |
| 161 | CPlusBor | Demonstration Software | ☑ | ☑ | Secure Wrap | deactivate |
| 186 | SecureWrap Demo | Demonstration Software | ☐ | ☑ | Secure Wrap | deactivate |
| 208 | Vendor Abrosoft | Civil | ☐ | ☑ | Secure Wrap | deactivate |
| 209 | Vendor SourceTec | Geotechnical | ☐ | ☑ | Secure Wrap | deactivate |
| 210 | CUBASE | Civil | ☑ | ☑ | Secure Wrap | deactivate |
| 211 | Indigo | Civil | ☐ | ☑ | Secure Wrap | deactivate |
| 212 | RZFun | Civil | ☐ | ☑ | Secure Wrap | deactivate |
| 213 | Note Pad | Structural | ☐ | ☑ | Secure Wrap | deactivate |
| 214 | Notepad2 | Demonstration Software | ☐ | ☑ | Secure Wrap | deactivate |

NON-INVASIVE METERING SYSTEM FOR SOFTWARE LICENSES

CROSS REFERENCE TO RELATED APPLICATIONS

This application claims the benefit of U.S. Provisional Application No. 61/749,221, filed on Jan. 4, 2013, which is incorporated herein by reference.

BACKGROUND

This invention relates generally to controlling access and usage of software, and more particularly, to metering of software usage.

Several common issues arise when software users wish to use specialized software applications, such as technical software applications like circuit design packages or relational databases. A number of these applications are narrowly focused and are useful to a very limited number of technical practitioners. Further, many applications are highly complex and specialized in nature, very complicated to operate, and are often very expensive, sometimes with retail prices of ten of thousands of dollars. Further, these specialized software programs are typically infrequently used by practitioners. The infrequent use of these titles combined with their very high retail prices leads to two common problems. First, technical practitioners will often avoid purchasing these software titles altogether. Unable to justify such purchases, the practitioners will often seek to use programs of lesser quality (and lower price) or alternative methods to solve problems (e.g., hand calculations, "homemade" computer programs or spreadsheets). Second, piracy of specialized technical software is commonplace. Technical practitioners, whether knowingly or unknowingly, will often violate the terms of their software license agreements through unauthorized duplication or concurrent usage.

Conventional technologies do not provide an efficient and non-invasive solution for licensing software on time-based, metered usage basis that allows for more cost-effective access to a range of users, minimizes the incentive for theft or violating the spirit of software licensing terms, enhances user portability and access, leverages the computing power of the user's resident workstation, and provides a secure means to approve, monitor, and charge for time-based metered usage.

SUMMARY

In various embodiments, methods and systems provide on-demand, metered usage licensing of software applications. A packaging module generates a secure application package for an original, unmodified application authored by a software publisher. The software publisher need not manually modify the code of the original application. Rather, the packaging module includes, within the secure application package but separate from the code of the application itself, a loader that causes the application of the secure application package to be securely loaded into memory. The loader also launches a shell application that controls runtime aspects of the software publisher's application, such as metering of the application.

The secure application package is made available to users wishing to use the application on a metered basis. Specifically, when users use the secure application package, the loader within the secure application package process extracts executable code for the application from the secure application package and places it in memory, without storing it within durable storage where it is accessible via the operating system file system. The loader launches the shell application, which in turn authenticates the user, and (if the authentication is successful) executes the application using the executable code extracted from the secure application package. The shell process also controls aspects of the execution of the application (e.g., using configuration settings that may also be included in the secure application package), such as metering of the application. Metering of the application includes communicating with a metering entity to inform the metering entity of how long the user has used the application, for example. The metering entity accordingly tracks the amount of usage of the application by the user and takes appropriate actions, such as reducing an account balance of the user to reflect the usage.

BRIEF DESCRIPTION OF DRAWINGS

FIG. 2C is an example screen shot depicting a user interface for requesting the creation of a secure application package, according to one embodiment.

FIG. 7 is an example screen shot depicting the credit card information input screen.

FIG. 13 is an example screen shot depicting the project tracking input window.

DETAILED DESCRIPTION

System Overview

Figure 1:
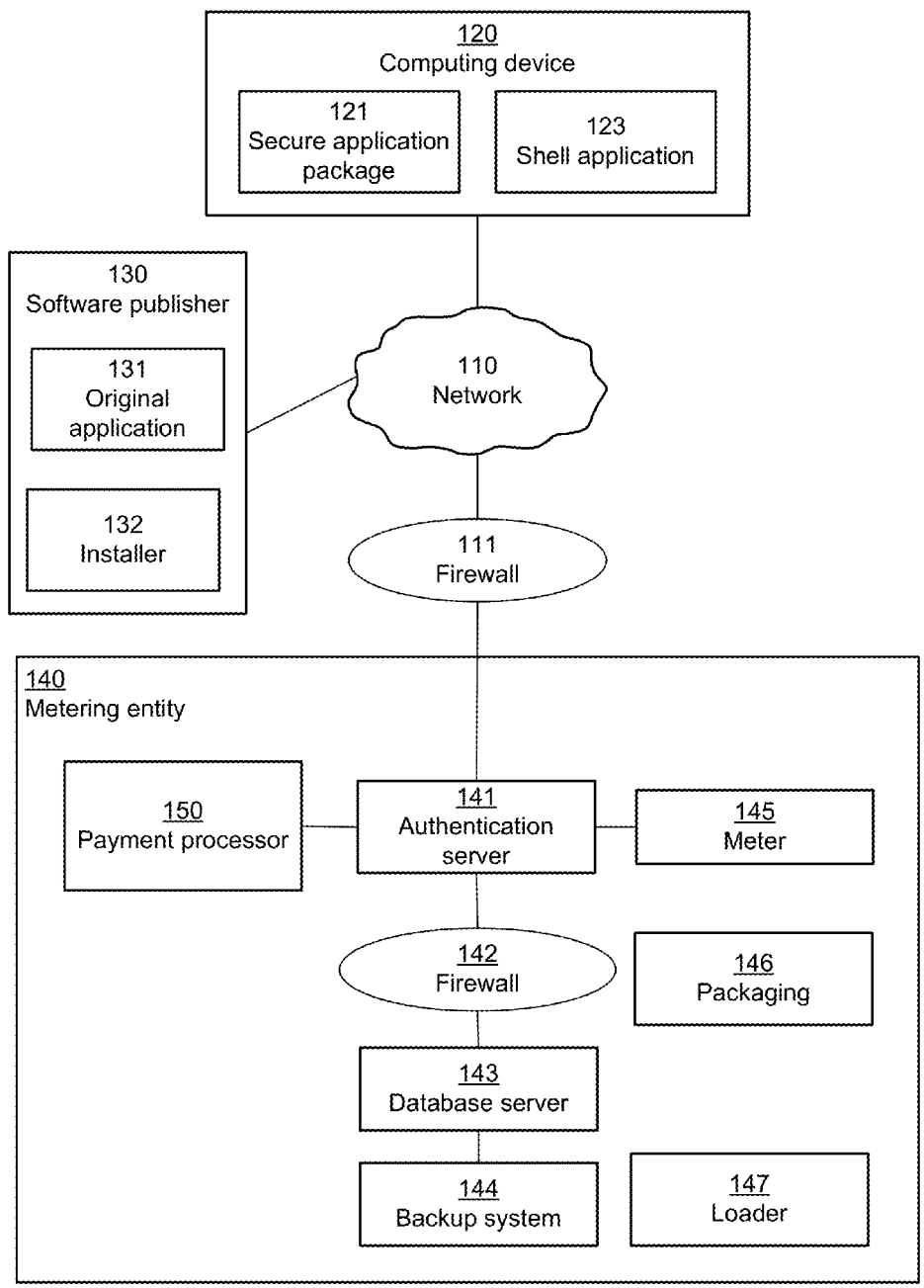
FIG. 1 is a high-level block diagram of the computing environment in accordance with an embodiment of the invention.

FIG. 1 is an illustration of a computing environment in accordance with one embodiment of the invention. The computing environment includes a user's computing device 120 (e.g., a desktop computer, laptop or ultrabook computer, a smart phone, or the like), at least one software publisher 130, and a metering entity 140 all connected via a network 110 such as the Internet. The invention enables third-party software publishers 130, also referred to herein as "vendors," to provide on-demand, metered usage versions of their software through a metering entity 140 to a user's computing device 120. This enables users to pay for software based on the time of actual use for a pro-rated fee.

A user pre-pays for use of a software application 131 of the publisher 130 by setting up an account. The user obtains a secure application package 121 containing the publisher's application 131 via the network 110 and stores it on the user's computing device 120. The user additionally obtains a specialized loader 147 (either separately, or as part of the secure application package 121). (As described below, the secure application package 121 and the loader 147 may be obtained indirectly, as part of an installer program 132, rather than being downloaded separately and manually by the user.) The loader 147 is an application that is used to load and launch the application 131 stored in the secure application package 121; since the secure application package 121 format differs from that of a native operating system executable, the loader 147 differs from the loader provided by the operating system itself. (The phrase "the application 121" is used herein as shorthand denoting the application 131 as packaged within the secure application package 121, including any additional behavior added to the application 131 by a shell application 123 (described below).) When the loader of the secure application package 121 executes, the user supplies his or her account credentials to the authentication server 141 of the metering entity 140. The metering entity 140 is located behind an intrusion detection system (IDS) firewall 142. Once the correct account credentials are entered, the (previously encrypted) application 131 within the secure application package 121 is ready to use, and usage is tracked on a metered basis. The pre-pay amount is deducted on a pro-rated basis at the metered usage rate for the particular application 131. Once an account has been established, the user may download the secure application package 121 for any available application 131 to an unlimited number of computing devices 120. In one embodiment, the applications 131 are not usable via the secure application packages 121 without an Internet connection to the authentication server 141 to allow for real-time licensing and tracking of the metered use.

When a user of the computing device 120 decides to purchase an application 131 (or more specifically, its corresponding secure application package 121), the purchase occurs via the authentication server 141. The user establishes an account, and a minimum charge is made to the account, e.g., via a credit card transaction with a credit card processor 150.

Information is passed over the network 110 via an encrypted, secured connection. The user downloads the secure application package 121 over the network 110 to their computing device 120. (The secure application package 121 is created by a packaging module 146, as is described in more detail below with respect to FIG. 2B. The packaging module 146 may, but need not be, a component of the metering entity 140, as illustrated in FIG. 1. In one embodiment, the user does not download the secure application package 121 directly; rather, the software publisher 130 creates an installer program 132 that when executed on a computing device 120 places the secure application package 121 on the computing device, along with any ancillary programs or files needed to execute the secure application package, such as the shell application 123.) Use of the application 131 is controlled using the shell application 123 (which may be included within the secure application package 121 by the packaging module 146), which allows the application to communicate with the authentication server 141 during use. The usage is metered and tracked, and the user's pre-paid account is deducted appropriately based on the amount of software usage.

Figure 2A:
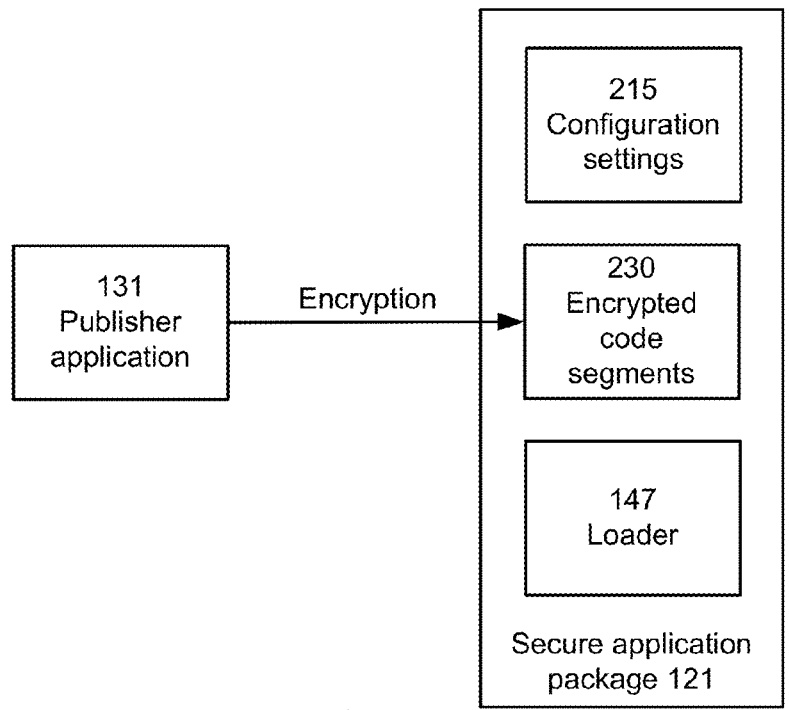
FIG. 2A illustrates the contents of a secure application package, according to one embodiment.

The secure application package 121, as illustrated in FIG. 2A, includes several components: (a) the vendor's original application 131 (e.g., in encrypted form 230), (b) configuration settings 215 used to control runtime aspects such as application metering, and (c) a loader 147 made up of proprietary code of the creator of the secure application package. When the secure application package 121 is first loaded, the loader 147 communicates with the authentication server 141 for metering and licensing purposes by means of a dynamic-link library (DLL) that was (for example) obtained at the same time as the shell application 123. The loader 147 prompts the user to provide the user's credentials to verify that the user has access to use the original application 131. The shell application 123 sends the credentials to the authentication server 141, e.g., as an HTTPS GET request. In one embodiment, the credentials include the user's username/password, an identifier of the user's account, and an identifier of the application 131 being executed. The authentication server 141 grants permission by checking that the account is valid and current, the user pre-paid account has sufficient funds, the user is valid and current in the context of the account, the user has provided correct password credentials, the account has purchased rights to the application 131, and the user has rights to use the application (assigned by the account administrator). The authentication server 141 then sends a response back to the shell application 123 specifying whether the user was successfully authenticated.

If authentication was successful, the loader 147 executes a template process with an empty code segment, which causes the operating system to allocate the template process in memory. The loader 147 also decrypts and reconstructs the vendor's original (unencrypted) application 131 in the memory allocated for the template process. The application 131 is thus stored in decrypted form only in primary memory and is not stored in decrypted form on any client-side durable secondary storage, which enhances security of the application code by protecting it from unauthorized copying on the client side. The loader also launches the shell application 123, which handles metering of the application 131.

Once a connection has been established, the application 121 sends a message to the authentication server 141 at given intervals (e.g., every minute) via its shell application 123. In one embodiment for use with the MICROSOFT WINDOWS operating system, the shell application 123 is loaded into a comments file within the WINDOWS operating system. The shell application 123 may be obfuscated for security purposes. In one embodiment, information passed to the authentication server 141 includes vendor name, application name, user name, MAC address, IP, DLL version, login name, time in, and time out. In one embodiment, the transmissions between the application 121 and the metering entity 140 are encrypted.

During use of the application 121, the use is metered and tracked. Funds are deducted on a pro-rata basis for the user's pre-paid account. During use, a user may pause the application and the usage meter using the shell application 123, rendering the application inoperable. If, at any time, the account's balance falls below a pre-configured threshold, a credit card transaction through the credit card processor 150 is initiated to replenish the balance. Otherwise the user is warned and the application will terminate after a configurable amount of time. A user may log out of the application at any time. This can be done by standard methods of exiting a software application, including closing the application window or selecting "exit" or "log out" from the application menu. The application may also terminate should the connection to the authentication server 141 be severed, as the application contacts the server repeatedly (e.g., every minute). As an alternative, a special "accounts receivable" account may be established for the user. The tracking of use and operability are all identical, except that funds are not deducted from an account during use. The user is sent an invoice with charges during the billing period for payment. As another alternative, a vendor 130 may establish a demonstration account for a user for marketing purposes. Although tracked, the usage is free and is not billed. This scenario is offered on a time-limited basis at the discretion of the vendor 130. Once the user exits the program, a logout message is sent to the authentication server 141. If the connection is lost the authentication server 141 will timeout the session after some period of inactivity. All user records, including account information, metered usage history, and credit card transactions are stored on backup system 144.

Security is maintained with two approaches. First, in one embodiment all communication is performed using HTTPS over port 443. HTTPS is an industry standard and ensures the content of the message is encrypted. After the HTTPS connection is established, the loader 147 may further encrypt the user credentials (e.g., the user's password) using an algorithm such as the Advanced Encryption Standard (AES) or Secure Hash Algorithm (SHA), with the authentication sever 141 performing decryption to obtain the credentials.

Second, the user account database within database server 143 is encrypted behind an intrusion protection system (IPS) firewall 142. The database server 143 is a "black box" that contains all user information, account information, and credit card information; it also meters the software usage. When prompted by the database server 143, the authentication server 141 communicates with the credit card processor's 150 servers via an encrypted connection to authorize charges.

The software publisher 130 also communicates with the authentication server 141 via the network 110. Through its account, the publisher 130 may view, in real-time, all users of their software as well as length of session times for each user. The publisher 130 also has the capability to directly communicate to users to distribute marketing materials and information.

Creating Metered-Usage Software Applications from Vendors

Figure 2B:
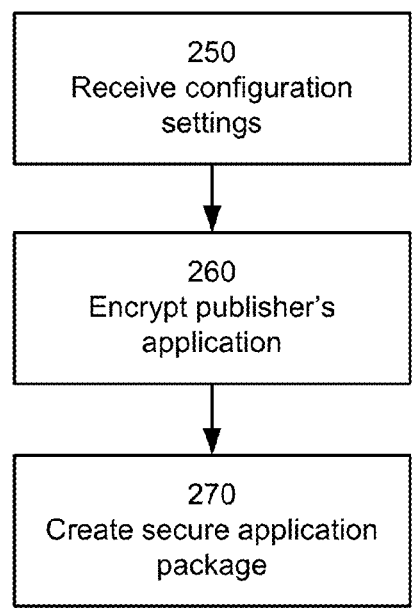
FIG. 2B is a flow chart illustrating creation of the secure application package by the packaging module of FIG. 1, according to one embodiment.

FIG. 2B is a flow chart illustrating creation of the secure application package 121 by the packaging module 146 of FIG. 1, according to one embodiment. The process of FIG. 2B is initiated by a software publisher 130 uploading the executable code for the original application 131 to the metering entity 140 and requesting the creation of a corresponding secure application package 121. For example, FIG. 2C illustrates a number of applications for a given software publisher 130 that have been uploaded to the metering entity 140. Selection of the "Secure Wrap" user interface element for a corresponding one of the applications initiates the creation of a secure application package 121 for that application 131.

Figure 2D:
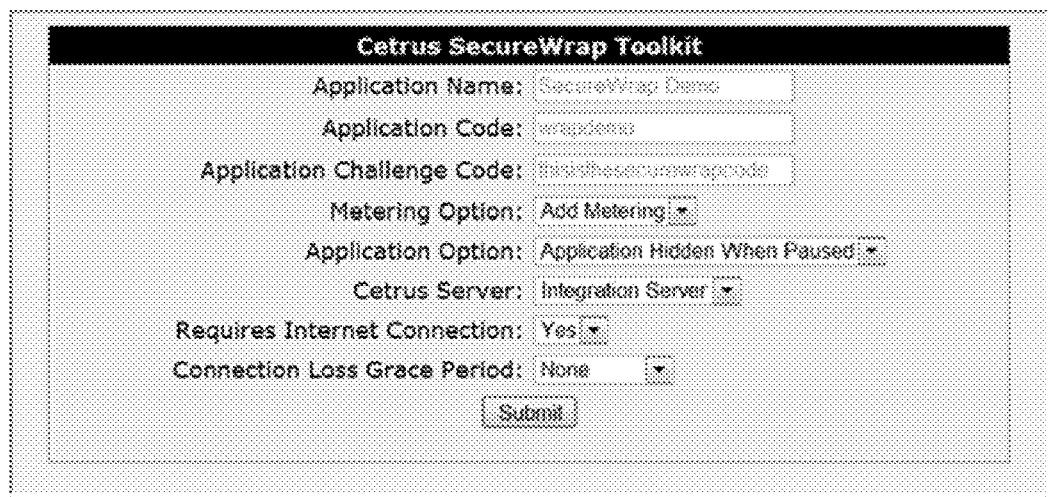
FIG. 2D is an example screen shot depicting a user interface for specifying configuration settings for a secure application package, according to one embodiment.

The packaging module receives 250 the configuration settings 215 used to control how the publisher application 131 executes at runtime, as well as other properties of the application. In one embodiment, these settings are specified by the publisher via a user interface. FIG. 2D illustrates an example of one such user interface, which allows the publisher to specify properties such as: the name of the application; the name of the secure application package 121 to be created for the application 131; whether metering functionality is added to the application; a challenge code to be used when communicating with the authentication server 141; how the application behaves when its execution is paused (e.g., being hidden, or being displayed so as to signify that it is disabled); whether the application will be permitted to execute when there is no network connection; and an amount of time that the application will be permitted to continue to execute after loss of the network connection is detected. The packaging module 146 receives these configuration settings 215 (e.g., in response to selection of the "Submit" button of FIG. 2D) and includes them within the secure application package 121.

The packaging module 121 further encrypts 260 the publisher's application 131, thereby producing encrypted code segments 230. As a result, the original application 131 is not made available in directly usable form, which greatly reduces the risk of the original application being improperly obtained and used.

The packaging module 121 creates 270 the secure application package 121. As noted above, the secure application package 121 includes the configuration settings 215, as well as the encrypted code segments 230 that result from encryption of the original publisher application 131. The secure application package 121 further includes the shell application 123 that when executed controls aspects of the operation of the publisher application 131, such as metering.

In one embodiment, the software publisher 130 then creates an installer program 132 for the secure application package 121. For example, the installer program 132 might include the secure application package 121 inline within the installer program. When executed, the installer program may cause the secure application package 121 to be copied to a directory on the computing device 120 and may also install the shell application 123 and any associated files (e.g., a dynamic link library for communicating with the shell application) on the computing device 120 if they are not already present. The software publisher 130 may upload the installer program to the metering entity 140 or to some other system that makes the installer program available to the computing device 120.

User Account Setup

Figure 3:
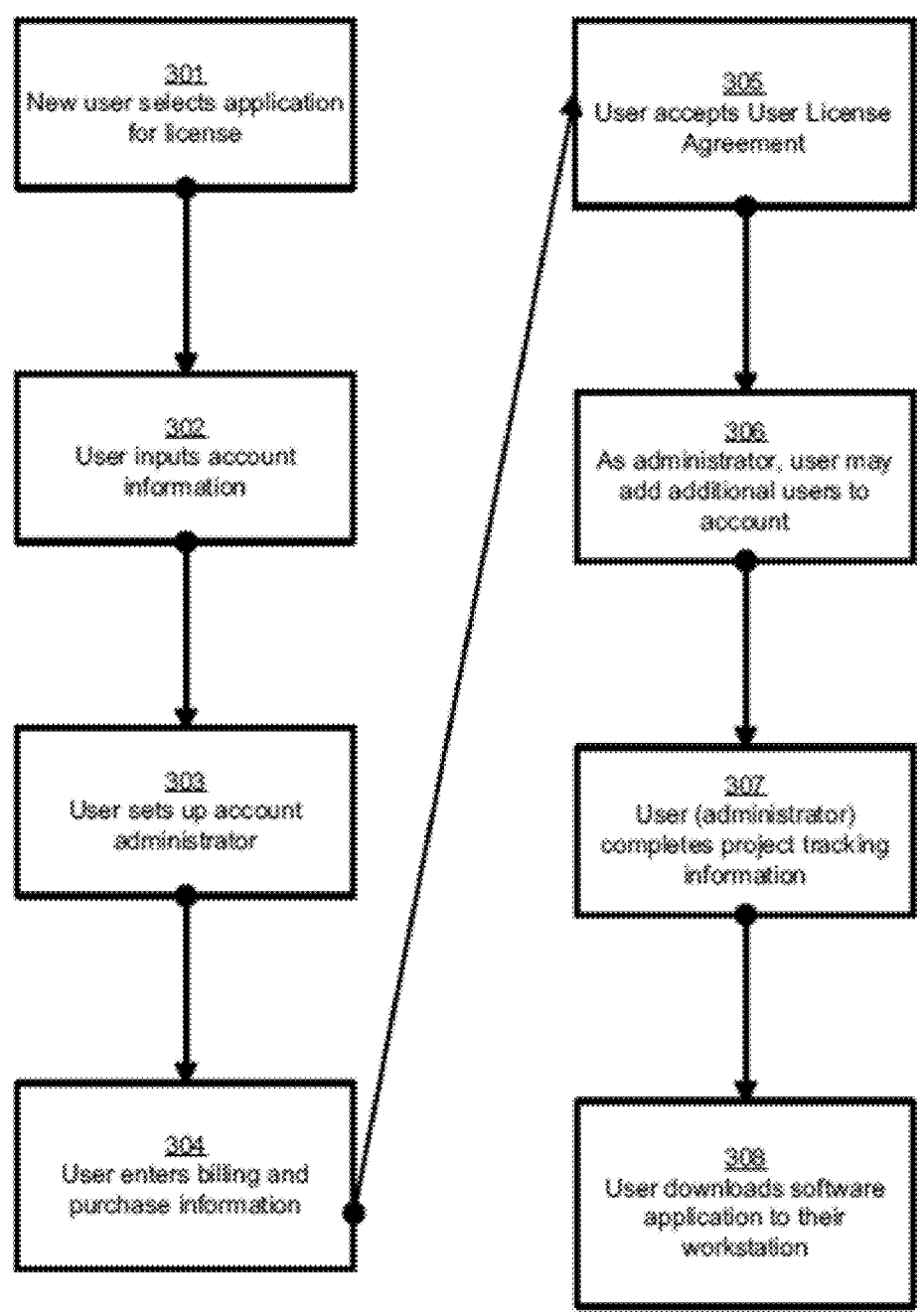
FIG. 3 is a flow chart illustrating a method of establishing a user's account, in accordance with one embodiment.

FIG. 3 is a flow chart illustrating a method of establishing a user's account, in accordance with one embodiment. The method will be described with reference to the screen shots of FIGS. 4-10.

Figure 4:
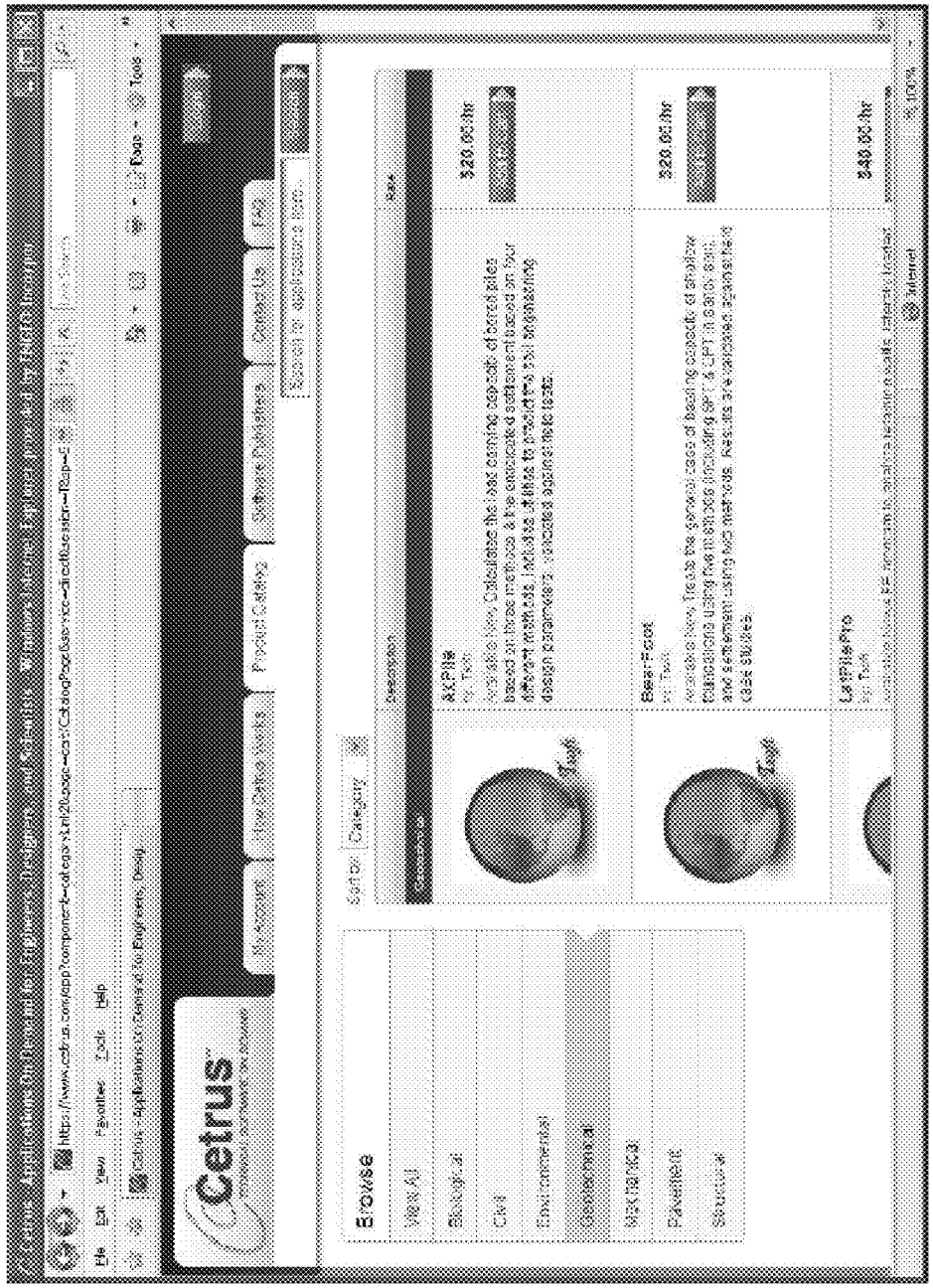
FIG. 4 is an example screen shot depicting the software library purchase page.

In step 301, a user selects a software application 301 or multiple applications for purchase. FIG. 4 illustrates an application library page from which a user can make selections. The user is presented with a page to confirm or cancel the impending purchase. By accepting the purchase agreement the user is required to acknowledge the following items: 1) the prescribed metered usage rate; 2) pre-pay amount; 3) the recharge floor; and 4) the recharge amount. The pre-pay amount is a minimum transaction fee. It represents the initial credit that will be charged to a user's account. It typically represents a value equal to 3 to 5 hours worth of the metered usage rate in order to provide for an adequate block of rental time for use, avoid "draining" the account too quickly, and provide a buffer so the account is not drawn to zero. The user may select an amount equal to or any amount above the minimal rate. The recharge floor is a minimum account floor. When the pre-pay amount is depleted through use, it will reach this floor, at which time the account value will be replenished. The value of the replenishment is equal to the recharge amount. The recharge amount is the ongoing replenishment amount and is used throughout the history of the given account.

Figure 5:
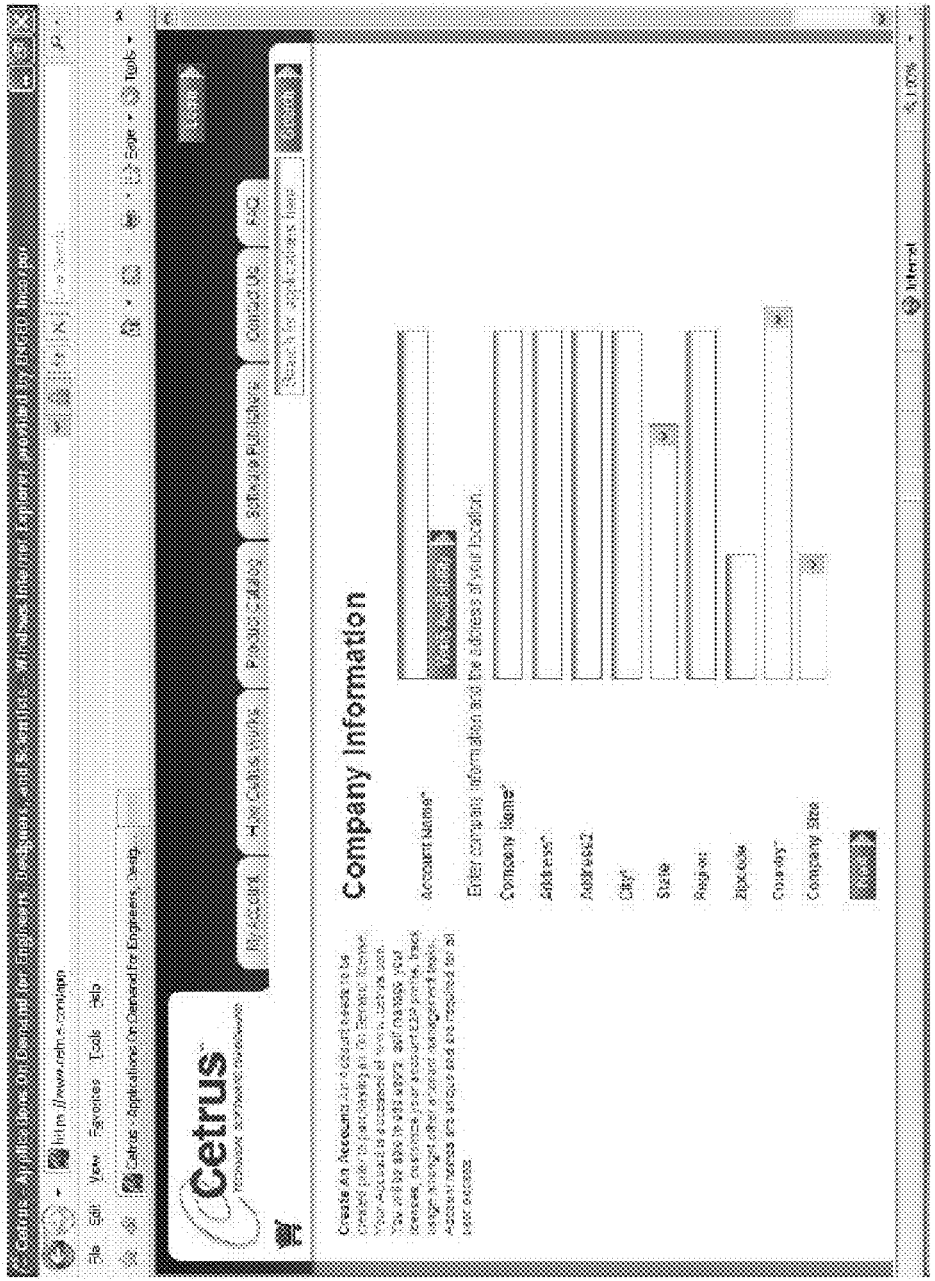
FIG. 5 is an example screen shot depicting the new account set-up screen.

In step 302, the user enters the new user account "wizard" which is illustrated in FIG. 5. The user enters an account name. The account name is a unique identifier and acts as a "domain name". The user also enters a user ID as well as typical registration information, including name, address, telephone number, email address, etc. Once the user information is entered and confirmed, a welcome email is automatically sent to the user. Duplicate account information (i.e., already exists in the system) is not allowed. In the event that duplicate account information is entered, an error message accompanied by clear delineation of the error (for example, text turns red) results.

Figure 6:
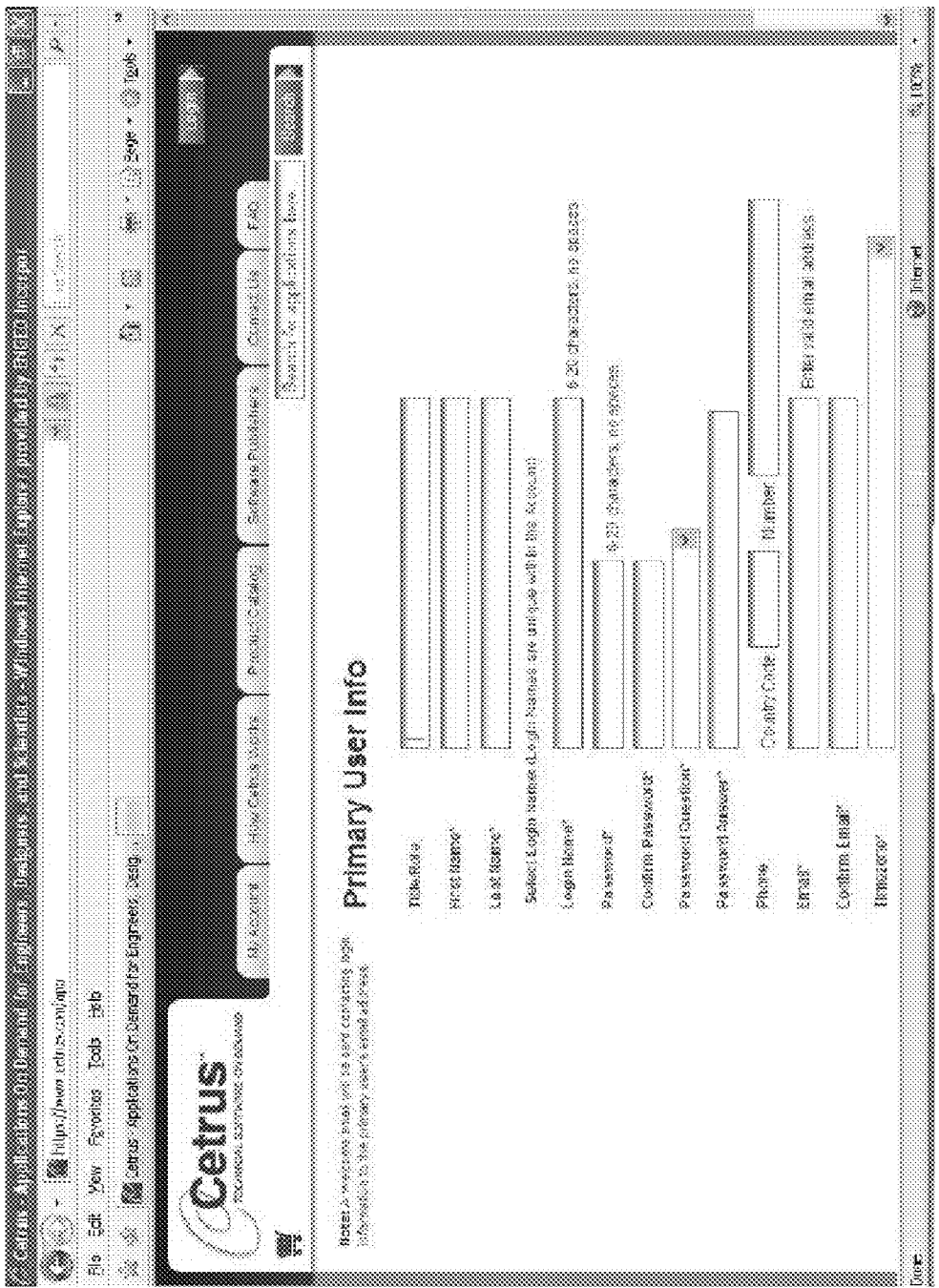
FIG. 6 is an example screen shot depicting a data input screen for the user account administrator.

In step 303, the user is prompted with another data entry box illustrated in FIG. 6 pertaining to setup for an administrator; this is unique to the initial user for a given account name. This capability allows the initial user to act as or assign administrative rights to another individual. The administrator controls access to software programs; adding or removing users, applications, and controlling which users have access to each application. As an alternative to step 303, the prospective administrator may have their account and all respective account information completed on their behalf.

Figure 7:
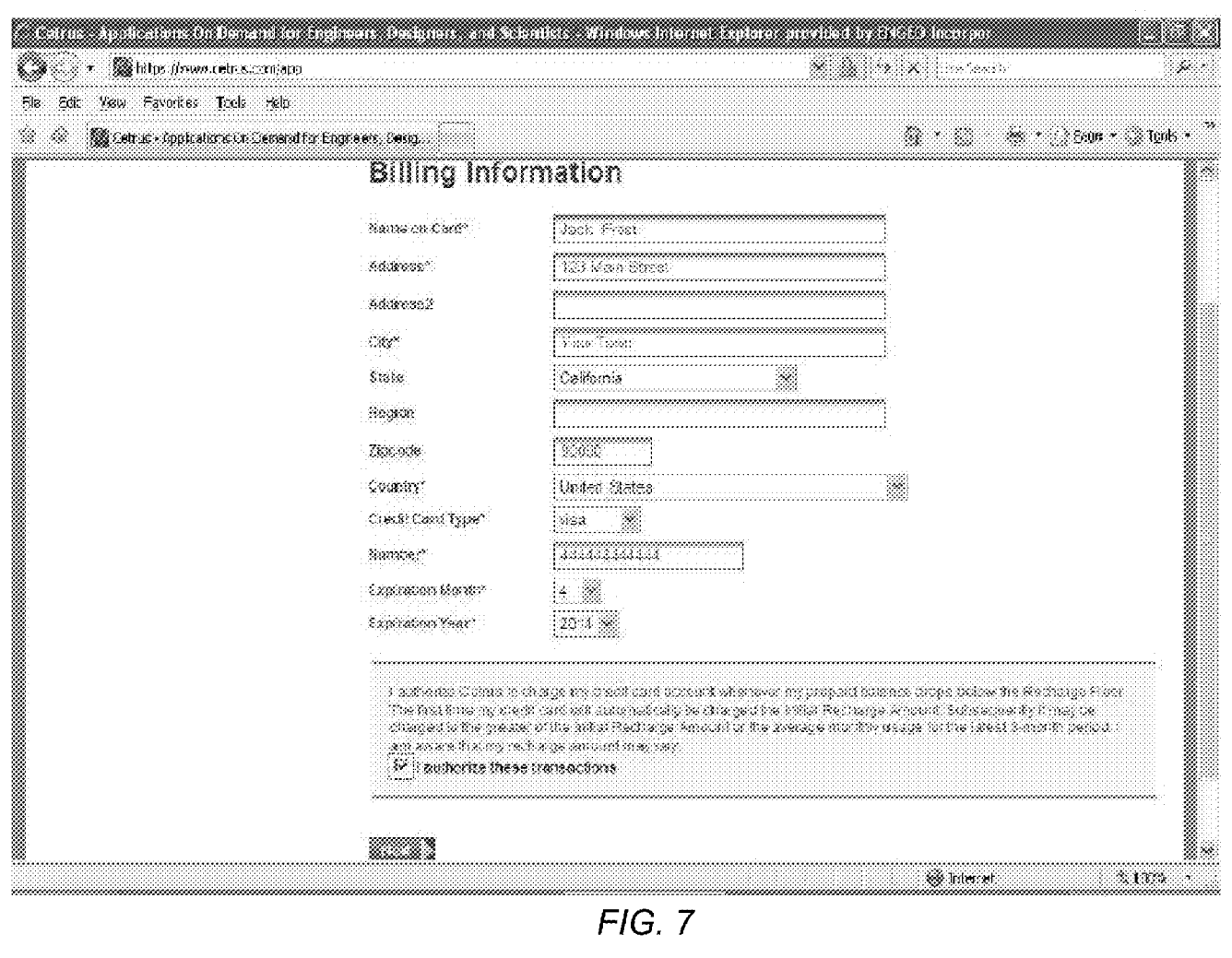

In step 304, the user enters credit card information into a billing information page illustrated in FIG. 7. All of the information is cached. Major credit cards are accepted for payment. The credit card is charged upon the initial purchase as well as at intermittent times when software use has reduced the user's account to the recharge floor. As an alternative to step 304, the user has the option to avoid entering a credit card and using the method outlined above. With prior approval, a special "accounts receivable" account may be established for the user. The tracking of use and operability are all identical, except that the use is sent an end-of-month invoice for payment.

In step 305, the user is presented with a purchase screen. The screen asks the user to confirm all of the entered information and summarizes the application and charges to be incurred (title, software publisher, metered rate, total charge). The user acknowledges the terms of the User License Agreement (ULA) by clicking "yes"; then affirmatively clicks for the purchase. A printable receipt is generated. The user may enter notes and print the receipt prior to closing the pop-up window. A confirming welcome email summarizing the purchase is sent to the user. The account name, user name, and password may appear in the email.

Figure 8:
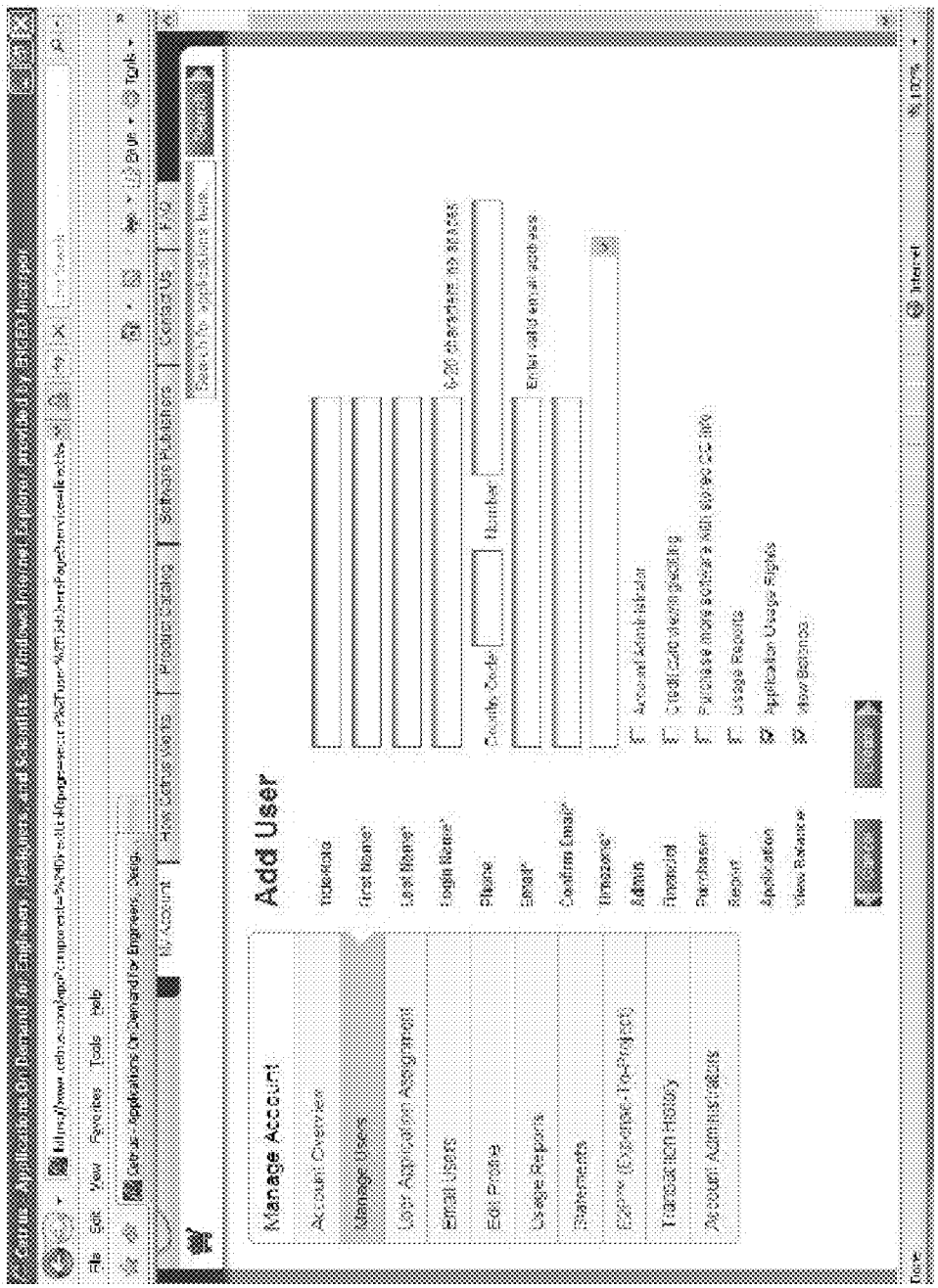
FIG. 8 is an example screen shot depicting the administrator screen for adding users to an existing account.

In step 306, additional users may be added to the account using the interface depicted in FIG. 8. This conveniently allows client groups (i.e., a company, a branch, or a working group) to set up one account. To add additional users, the user with administrative credentials ("administrator") logs into their account. The administrator may amend the credit card balance to increase the available usage. Each user may be assigned specific rights by the administrator. These include software usage rights, software purchase rights, administrative rights, reporting rights, and access to financial information. The administrator assigns these rights at their discretion to users within the account group. As an alternative to step 306, modifying users, user rights, and tracking fields may be performed at any time. The initial account setup provides a convenient time to perform these tasks; however, the data may be entered at any time to meet the needs of user organizations. This allows users to flexibility in handling changes in staffing, their client needs, and accounting system changes.

Figure 9:
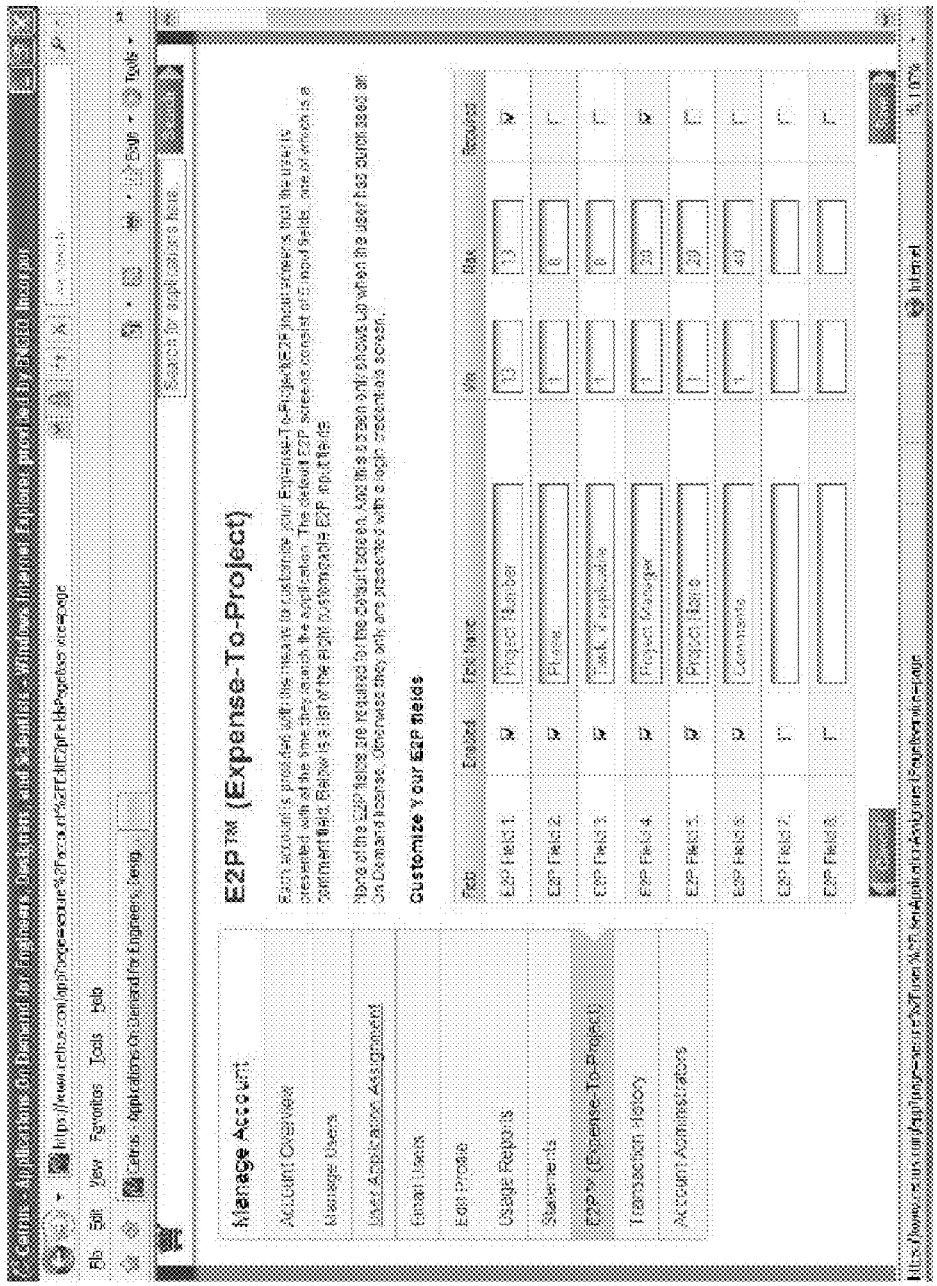
FIG. 9 is an example screen shot depicting the set-up of the project tracking.

In step 307, the expense and project tracking fields are established as illustrated in FIG. 9. The fields are fully customizable at the discretion of the administrator. They may include such information as project name, project number, client name, employee name, and other necessary tracking information. The administrator has the discretion to establish these parameters as well as minimum and maximum character lengths for each field. This function allows for easy tracking of software usage, allowing the user to generate a client or project-specific invoice for reimbursement.

Figure 10:
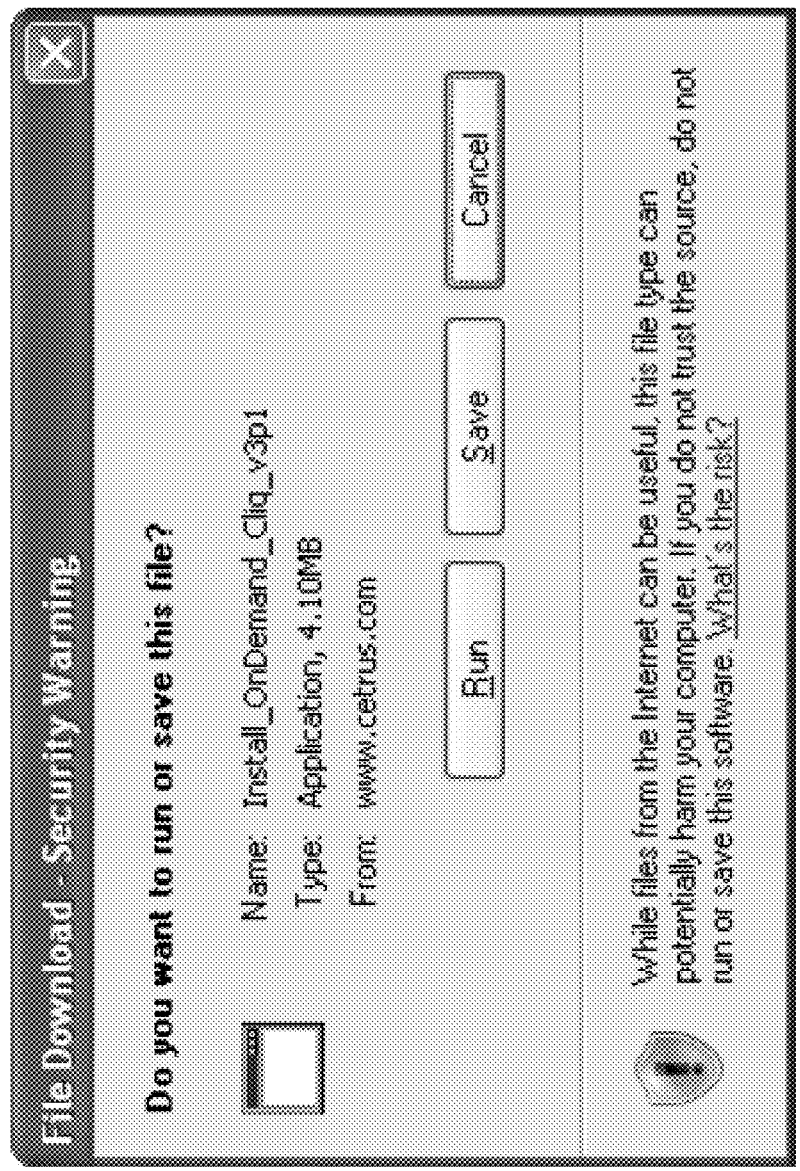
FIG. 10 is an example screen shot depicting the application download window.

In step 308, the user is able to download a secure application package 121 for an application 131 (or the installer program 132 therefor) to their computing device 120. FIG. 10 illustrates an application download window. When the user chooses to download the software, one file for the secure application package 121 (or the associated installer program) is sent from the authentication server 141. The user is presented with a file run window and a security box with the option of selecting "run", "save", or "cancel". The user may select any option, although "save" is recommended as it is the fastest method. The file is downloaded to the computing device 120. This process is similar to other typical software downloads and once complete, an icon will appear on the user's desktop screen for subsequent launch. In one embodiment, the shell application 123 is also downloaded if the computing device 120 does not already have it installed. In another embodiment, both the shell application 123 and the secure application package 121 are included within a larger package that is downloaded, and the shell application 123 is installed on the computing device 120 if it is not already present.

User Account Usage

Figure 11:
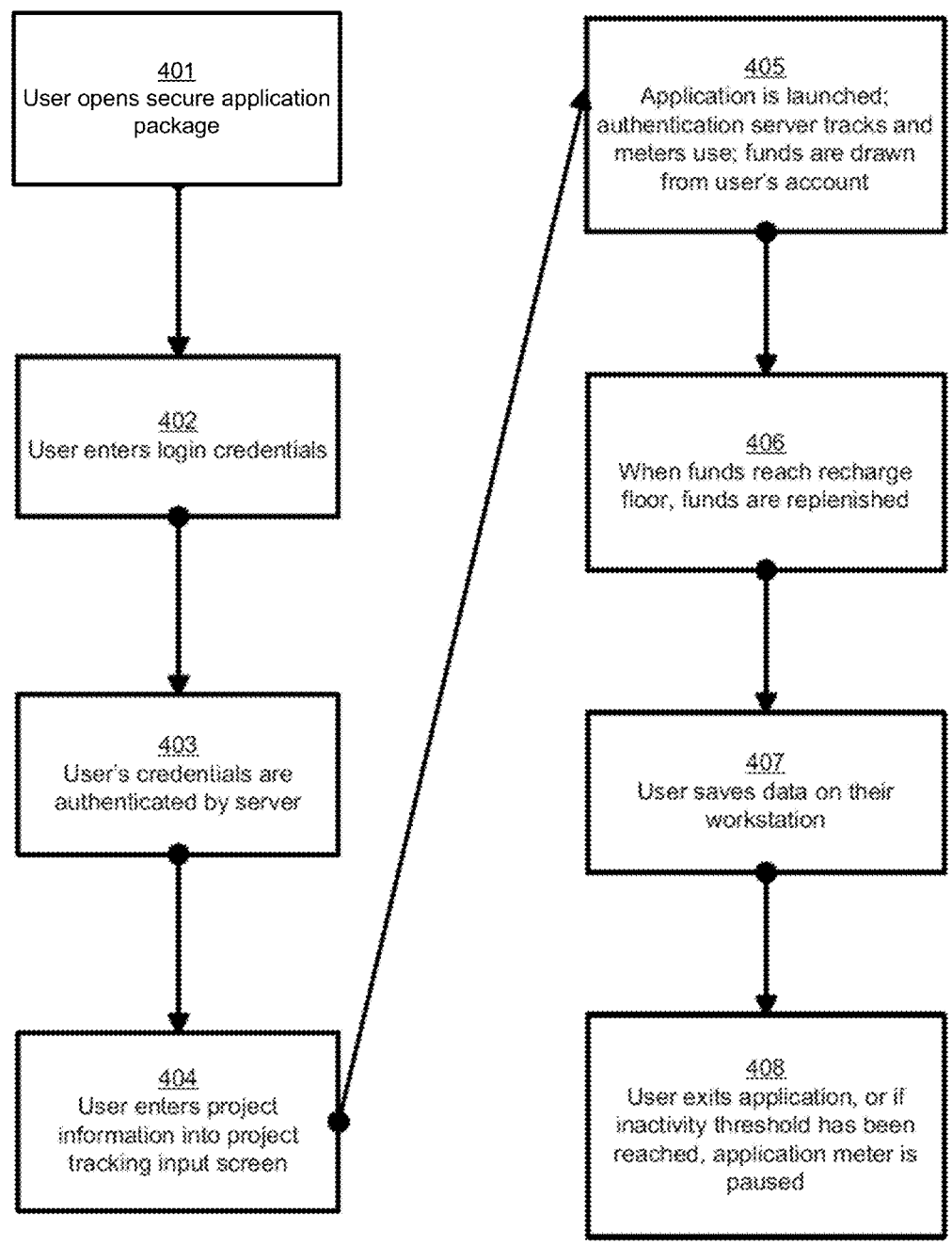
FIG. 11 is a flow chart illustrating a method of metering a user's usage of a software package through the user's account, according to one embodiment.

FIG. 11 is a flow chart illustrating a method of a user's usage of software, in accordance with one embodiment. The method will be described with reference to the screen shots of FIGS. 12-15.

In step 401, a user, previously having established an account and desiring to use the software, opens the secure application package 121 on their computing device 120, thereby executing the loader within the package. The application 131 within the secure application package is disabled and unable to be used until the user's credentials are verified.

Figure 12:
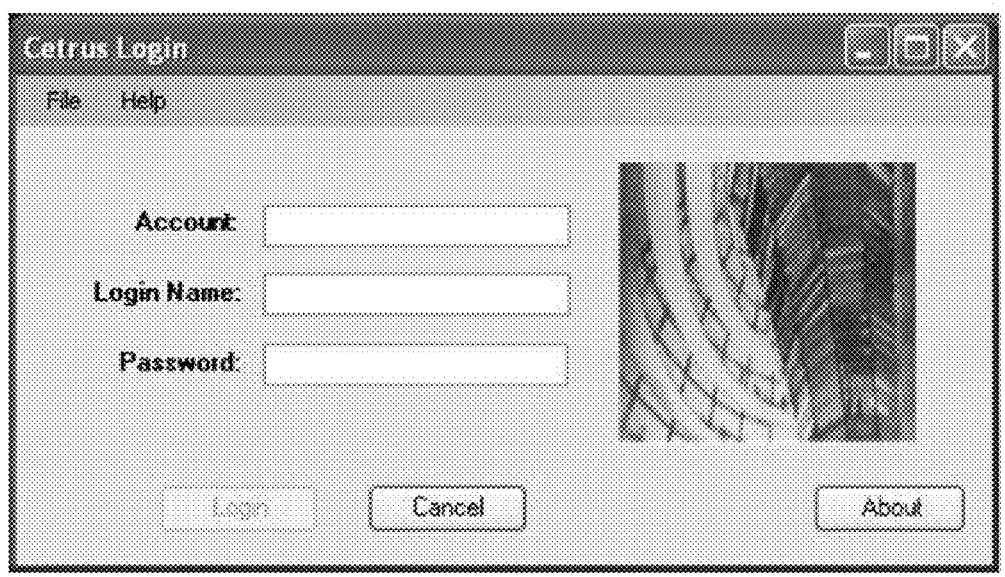
FIG. 12 is an example screen shot depicting a user login window.

In step 402, when the secure application package 121 is opened, the loader 147 is launched and initiates the authentication process, during which the user is presented with a login box as illustrated in FIG. 12. The user enters the name of their account, their user identification name, and a password. Once this information has been entered, the user submits these credentials.

An Internet connection is established, and the credentials are submitted as a license validation request to the authentication server 141 via a secured connection. Data that identifies the software application 131 is relayed by the shell application 123 to the authentication server via the network 110. The transmitted data is encrypted for security purposes.

In step 403, the authentication server 141 verifies the user's credentials, confirming that the user is a legitimate member of the respective user account, that the user has permission to use the specific software application 131, and that the user's account contains a sufficient balance of funds for the anticipated software usage.

In step 404, assuming the user's credentials have been verified and accepted, the loader launches the shell application 123, which presents the user with a project tracking screen. The user enters all relevant project-related data into the appropriate data entry boxes as illustrated in FIG. 13. The administrator has the ability to pre-select what data will be required and/or optional into these data fields. The administrator will commonly select data that is common to their respective organization, such as client name, project number, and user name. The character length as well as the content of each of these data fields is fully customizable.

In step 405, once the project-specific data has been properly entered into the tracking screen, the encrypted code segments 230 of the secure application package 121 are decrypted by the shell application 123 and loaded into memory, and the application 131 is then ready for use. Once decrypted, the application is a fully functional software version with capabilities similar to a "stand-alone" software version. During use of the application 121, the shell application 123 communicates on a regular ongoing basis with the authentication server 141. This communication (e.g., a "ping") occurs, for example, every 60 seconds. It serves several functions. First, it verifies the connection is still established between the user's workstation and the authentication server. Second, it verifies that the user has proper credentials to continue with the use of the application. Third, it invokes and maintains operation of the usage meter, recording time of use. In some embodiments, the usage meter tracks usage to the second. A pro-rated share of the hourly cost to operate the respective software application is deducted from the user's pre-paid account.

Figure 17:
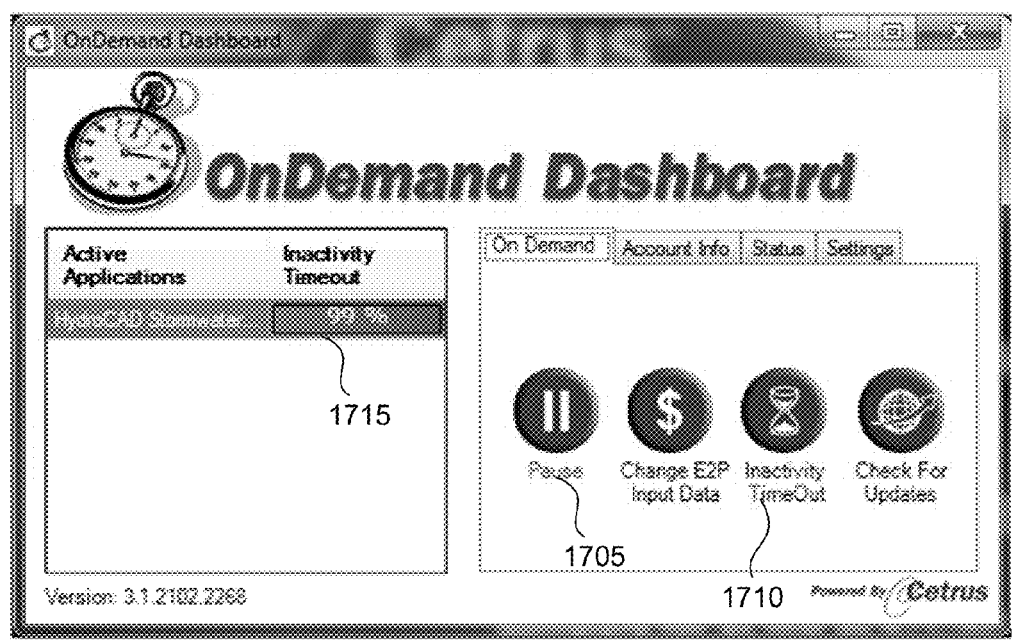
FIG. 17 is an example screen shot depicting a user interface for controlling usage of an application, according to one embodiment.

The user may pause the application and the tracking meter during use via a user interface provided by the shell application 123, rendering the application inoperable. For example, FIG. 17 illustrates a user interface 1700 according to one embodiment for controlling usage of the application 121. For example, selection of the pause/unpause button 1705 will pause operation of the application and of the usage meter, or (after pausing) resume execution of the application. Selection of the inactivity time out button 1710 enables the user to specify how long the application 121 should sit idle before its execution (and the metering thereof) are automatically paused. The remaining portion of this specified inactivity time period is displayed in area 1715 (e.g., 99% of the remaining period) so that the user will be able to estimate how long it will be until the application 121 is automatically paused. In one embodiment, the user interface 1700 is displayed in response to the user selecting an icon within the operating system user interface, such as a system tray or taskbar within MICROSOFT WINDOWS. In another embodiment, the shell application 123 causes a button or other user interface element to appear within the user interface of the application 121, and the user interface 1700 is displayed in response to selection of that user interface element.

In step 406, as the user's pre-paid account balance is depleted and reaches the recharge floor, the account is replenished by the recharge amount. The authentication server 141 communicates with the credit card processor's servers (also encrypted via SSL) to authorize charges. Assuming that the user's credit card stored within their respective user account remains valid, the charge is processed, and the user's account funds are replenished.

In step 407, the user, during their normal course of use, is able to save all of their data to files maintained on their computing device 200 as they would with any other application that is maintained and/or used on their workstation. Once a pre-paid account has been established, and assuming they have permission from the account administrator, the user may download the secure application package 121 to an unlimited number of computing devices free of charge. Further, they user may download the secure application package for any application of their choosing that may be available for purchase to an unlimited number of computing devices free of charge. The usage fees are only applied when the software application is actually used following acceptance of a user's credentials.

In step 408, during the course of software operation, the user may exit the application 121 once their desired use has ended. The application is exited in methods common to software applications. The user is prompted to save their data prior to exiting the application. Once the application is exited, the shell application 123 terminates the meter, and the deduction of funds from the user's account is stopped. The balance remains within the user's account for subsequent software use. The user's account is a universal account; they may use any number of applications with funds being deducted from the same account during use.

Figure 14:
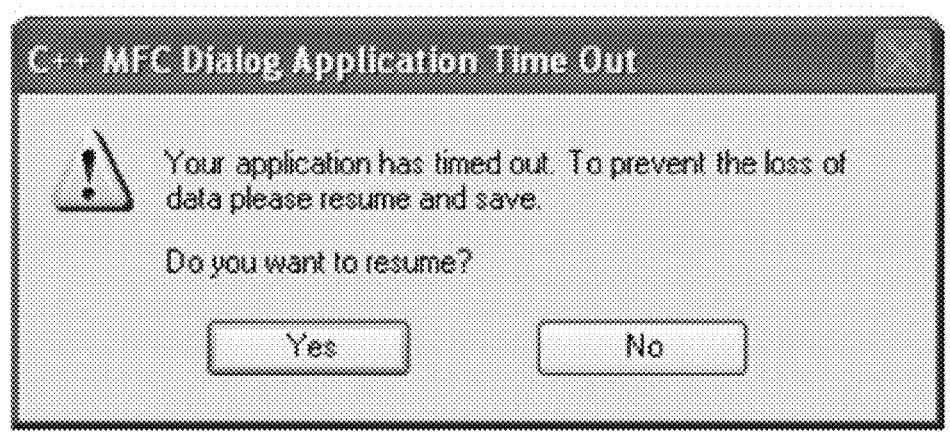
FIG. 14 is an example screen shot depicting the auto-pause prompt window.

Alternatively, in step 408, an auto-pause feature is invoked if the application 121 and the meter remain functional but active use by the user has stopped. An example of an auto-pause prompt is shown in FIG. 14. This scenario occurs commonly; a user may leave their workstation for a protracted period of time. The user may select their inactivity period time, ranging between 3 and 10 minutes. After the inactivity period has elapsed, a message is sent to the user to prompt them to continue use. If the prompt is not actively responded to by the user, the application and the meter are terminated.

Figure 15:
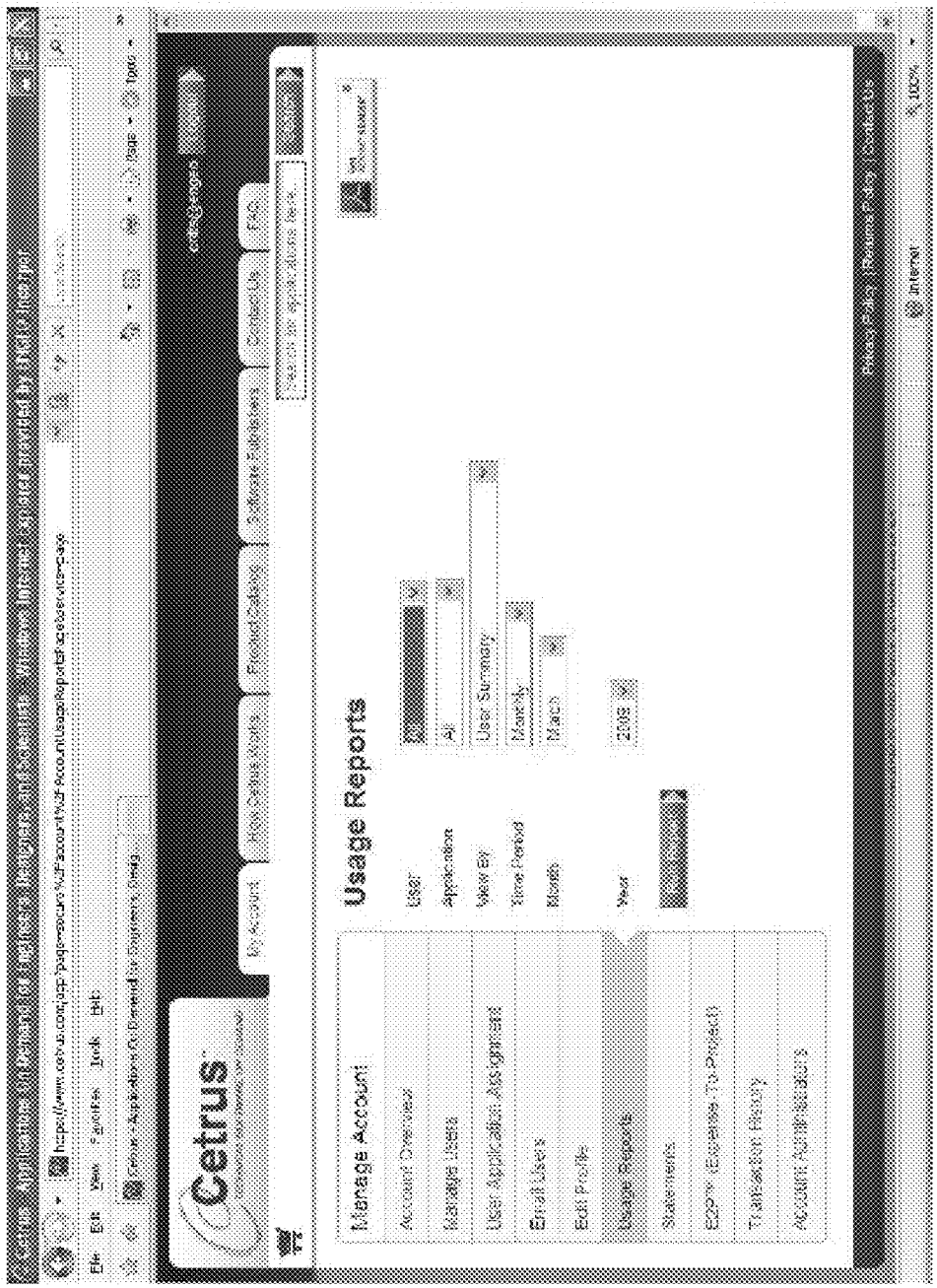
FIG. 15 is an example screen shot depicting the account usage report generation window.

The administrator may track software usage within their account at any time by generating a usage report from the interface shown in FIG. 15. The comprehensive tracking capability allows the administrator to view usage by date, application, time, user, and project. Depending on administrative rights granted to the respective users, the user may have ability to view some or all of this information as well as related financial information.

The user or administrator may generate a report summarizing the software usage. As in the case of usage tracking, the report may summarize information based on the contents of the query, including dates, software application, user or users, project, specific project client, or any combination thereof.

As an alternative to the method described above, with permission, the user may opt for an invoice as opposed to the pro-rated usage account deduction. In this case, the software usage for a given account is tracked on a metered basis. The usage for a given time period (i.e., monthly) is summarized, and the user is sent an invoice summarizing their usage and related charges for the time period. The user pays as they would for any other common invoicing method.

As another alternative to the methods described above, the software vendor may grant a free demonstration account to an existing or a potential user. The demonstration account is established for marketing purposes and allows a user free use for a period of time (typically one to two weeks). The usage is tracked via the meter; however, no charges are applied. The software offers full capabilities, and the vendor has the ability to track the free demonstration account usage.

Vendor Account

Figure 16:
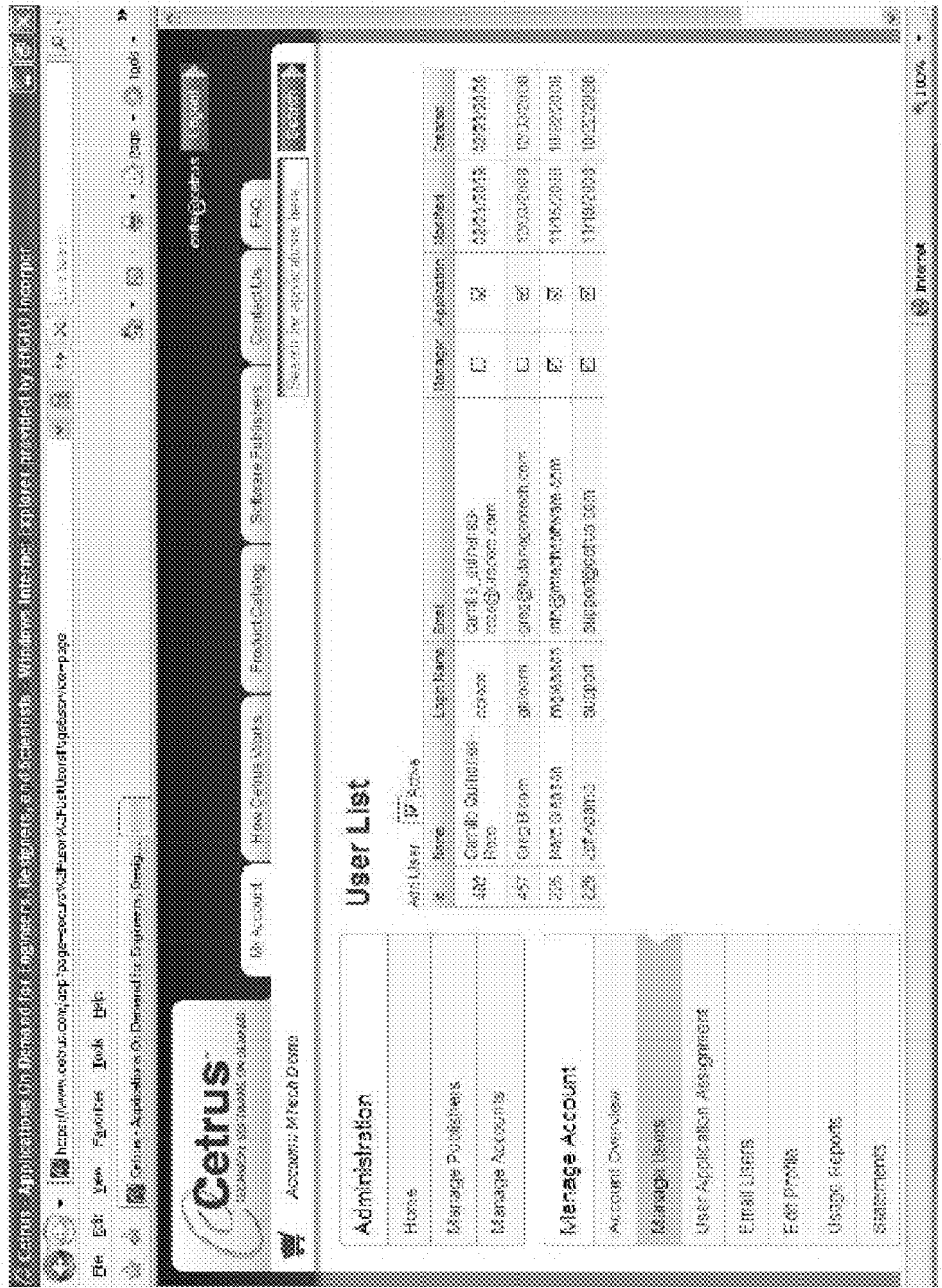
FIG. 16 is an example screen shot depicting the vendor's administration user tracking page.

The vendor 130 may gain access to their administrative account as shown in the example of FIG. 16. The purpose is to provide the full management capability to the vendor for the use of their applications. The vendor enters their credentials, including account name, user name, and password. Assuming the vendor has entered the correct credentials, they are granted access to this account. This account provides usage tracking capabilities that includes statements, usage, vendor administrative controls, and pre-approved marketing URLs. The vendor may review, at any time, usage associated with user account, user name, application name, date, time, and charge amount. The vendor also uses this account to update their contact information, marketing materials, and software descriptions. This serves as the means by which the vendor controls the information that is presented on the web site.

When first establishing their administrative account, the vendor is directed to their account home page. The vendor creates application page descriptions, including metered usage rates for the specific application. The vendor may also include a URL for each application. Typically, the URL is directed to the vendor's website or an appropriate marketing page and is used to provide more information pertaining to the application, other applications or products that may be useful with the application, or other appropriate strategies.

The vendor may access a vendor demonstration account. This account serves multiple purposes. First, it provides a vendor with the ability to demonstrate software to a user free of charge for marketing purposes. Software use is metered but is not billed. The Vendor may add potential users and provide a free period of usage to help entice a later purchase. The usage is tracked, but since it is non-billable, no charges or invoices are generated. Since the vendor has full tracking capability of this account, the metering allows the vendor to track demonstration usage, ensuring the demonstration use is in good faith. The second purpose of the account is to provide the user with a means to test the application during the software integration process. It is used to verify that the program has been implemented successfully.

The vendor has the ability to establish up to five different user account types. The account types feature different metering and billing combinations that are suitable to different types of account usage. The first is the aforementioned vendor demonstration account. It is metered but not billable (no credit card processing). It is used by the vendor for testing and for marketing/demonstration purposes. The second is "DevTest"—this runs the meter and is billable, but a real credit card transaction does not occur. This is used for software development purposes. The third is "Prod Test". This account does allow for a legitimate credit card transaction, by the software use is not metered. The fourth account type is an "Accounts Receivable" account. As previously described, this account meters software usage, but a credit card transaction does not occur. Instead, usage is tracked for a set period of time, and an invoice is generated and forwarded to a user account administrator for payment. The fifth type is the normal usage account. Software use is metered and tracked, and the user account fund balance is adjusted as appropriate.

Summary of Creation and Installation of Secure Application

Figure 18:
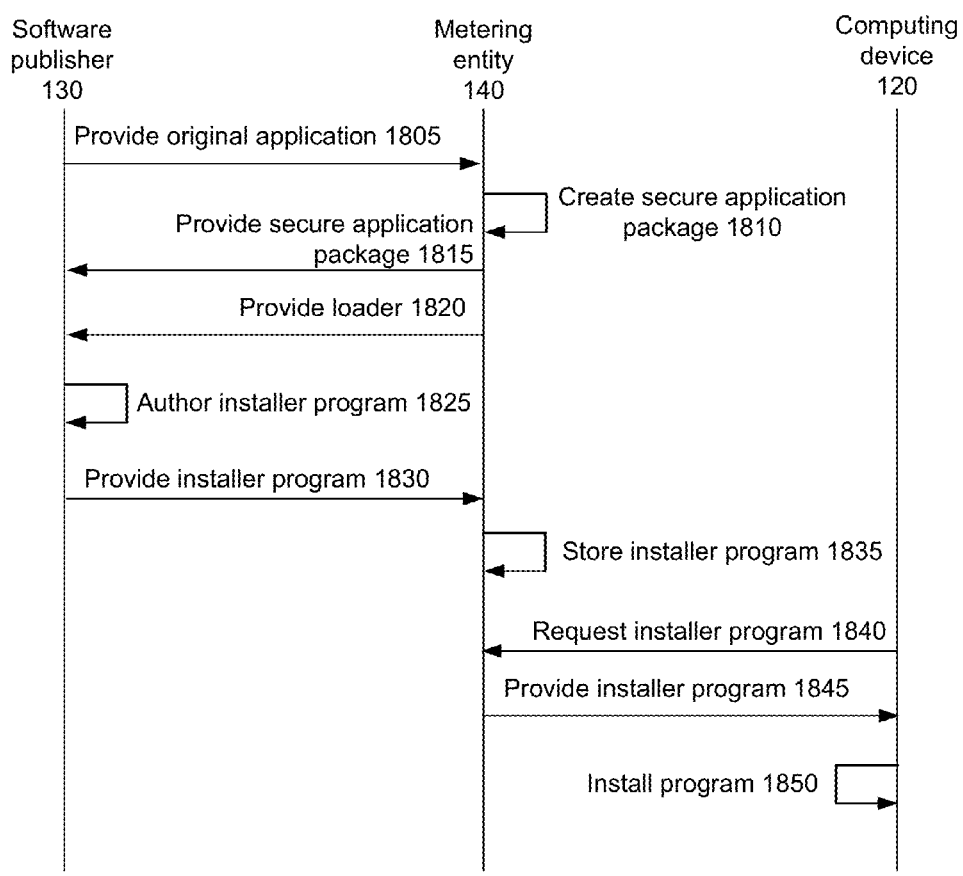
FIG. 18 is a sequence diagram providing another view of the interactions that take place between a software publisher, a metering entity, and a user's computing device when creating and installing a secure application package, according to one embodiment One skilled in the art will readily recognize from the following discussion that alternative embodiments of the structures and methods illustrated herein may be employed without departing from the principles of the invention described herein.

FIG. 18 is a sequence diagram providing another view of the interactions that take place between the software publisher 130, the metering entity 140, and the user's computing device 120 when creating and installing the secure application package 121, according to one embodiment.

The software publisher provides 1805 the original application 11 to the metering entity 140. The metering entity 140 then creates 1810 the secure application package 121 illustrated in FIG. 2A according to the method illustrated in FIG. 2B, e.g., in response to selection of the "Secure Wrap" user interface element of FIG. 2C. The metering entity 140 provides 1815, 1820 the resulting secure application package 121, and the loader 147, to the software publisher 130.

The software publisher 130 then authors 1825 an installer program 132 for the secure application package 121 based on the secure application package 121 and the loader 147. For example, the installer program 132 could include the secure application package 121 and/or the loader 147, or it could dynamically download them from the metering entity 140 when it executes. In an embodiment in which installer program 132 dynamically downloads the secure application package 121 and/or the loader 147, the metering entity 140 need not provide the secure application package and/or the loader to the software publisher 130. The software publisher 30 then provides 1830 the installer program 132 to the metering entity, and the metering entity stores 1835 the installer program.

A user may use his or her computing device 120 to request 1840 the installer program 132, e.g., via the user interface of FIG. 4. The metering entity 140 provides 1845 the installer program 132 in response to the request, and the user may then use the computing device 120 to install 1850 the secure application package 121 by executing the installer program 132. The installer program 132 may, for example, obtain the shell application 123 and any other supporting modules and place them in a predetermined location on the computing device 120. The installer program 132 may also place the loader 147 and the secure application package 121 (which may be combined into a single executable) onto internal storage of the computing device 120.

Thereafter, when the user executes the application (e.g., by double-clicking on an executable corresponding to the loader, or on a combination of the loader and the secure application package 121, or on a file instructing the operating system to execute the loader on the secure application package), the loader 147 loads and decrypts (only into memory of the computing device 120) the encrypted code segments 230 of the secure application package 121, as described above. The shell application 123 then controls the metering and other runtime behavior of the application 131, as also described above.

The present invention has been described in particular detail with respect to several possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer and run by a computer processor. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

What is claimed is:

1. A computer-implemented method for metering use of software, the method comprising:
   establishing an application usage account for a user, the application usage account having an account balance;
   receiving, from a third-party software publisher, an unmodified executable for a third-party application of the third-party software publisher;
   receiving configuration information specifying runtime properties of the third-party application, the specified runtime properties comprising a runtime behavior of the third-party application in response to an absence of a network connection of the third-party application with a remote metering server;
   producing an encrypted executable by encrypting the unmodified executable;
   generating a secure application package for distributing the third-party application, the secure application package comprising:
      the encrypted executable,
      the received configuration information, and
      a loader separate from the encrypted executable that when executed on a computing device:
         allocates, within memory of the computing device, a template process with an empty code segment;
         decrypts the encrypted executable into the empty code segment within the memory of the computing device, without storing the decrypted executable to durable storage of the computing device; and
         launches a shell application for controlling metering of the third-party application at runtime;
   providing to a remote computing device of the user, the secure application package and the shell application;
   receiving from the shell application executing on the remote computing device an authentication request including credentials of the application usage account of the user;
   verifying the received credentials;
   responsive to verifying the received credentials, providing an indication to the shell application that it may enable use of the third-party application on the remote computing device by decrypting the encrypted executable;
   receiving, at periodic intervals from the shell application executing on the remote computing device and controlling execution of the third-party application on the remote computing device using the configuration information of the secure application package, an indication of usage time of the third-party application by the user; and
   responsive to receiving the indications of usage time from the shell application, tracking time of use of the third-party application and deducting a corresponding amount from the account balance of the user based on the time of use.

2. The computer-implemented method of claim 1, wherein the loader decrypts the encrypted executable into the memory of the computing device responsive to verification of the account credentials.

3. The computer-implemented method of claim 1, wherein the shell application provides a user interface to enable pausing of usage of the third-party application on the computing device.

4. The computer-implemented of claim 1, further comprising periodically recharging the account balance when the account balance declines to a given minimum amount.

5. The computer-implemented method of claim 1, wherein the shell application notifies the third-party application to resume a thread spawned by an operating system of the remote computing device.

6. A computer program product comprising instructions stored on a non-transitory computer-readable medium, the instructions configured to cause a processor to perform a method comprising:
- establishing an application usage account for a user, the application usage account having an account balance;
- receiving, from a third-party software publisher, an unmodified executable for a third-party application of the third-party software publisher;
- receiving configuration information specifying runtime properties of the third-party application, the specified runtime properties comprising a runtime behavior of the third-party application in response to an absence of a network connection of the third-party application with a remote metering server;
- producing an encrypted executable by encrypting the unmodified executable;
- generating a secure application package for distributing the third-party application, the secure application package comprising:
  - the encrypted executable,
  - the received configuration information, and
  - a loader separate from the encrypted executable that when executed on a computing device:
    - allocates, within memory of the computing device, a template process with an empty code segment;
    - decrypts the encrypted executable into the empty code segment within the memory of the computing device, without storing the decrypted executable to durable storage of the computing device; and
    - launches a shell application for controlling metering of the third-party application at runtime;
- providing to a remote computing device of the user, the secure application package and the shell application;
- receiving from the shell application on the remote computing device an authentication request including credentials of the application usage account of the user;
- verifying the received credentials;
- responsive to verifying the received credentials, provide an indication to the shell application to enable use of the third-party software application on the remote computing device by decrypting the encrypted executable;
- receiving, at periodic intervals from the shell application executing on the remote computing device and controlling execution of the third-party application on the remote computing device using the configuration information of the secure application package, an indication of usage time of the third-party application by the user; and
- responsive to receiving the indications of usage time from the shell application, tracking time of use of the third-party application and deducting a corresponding amount from the account balance of the user based on the time of use.

7. The computer program product of claim 6, wherein the loader decrypts the encrypted executable into the memory of the computing device responsive to verification of the account credentials.

8. The computer program product of claim 6, wherein the shell application provides a user interface to enable pausing of usage of the third-party application on the computing device.

9. The computer-implemented method of claim 3, wherein the shell application provides a user interface comprising a pausable meter that tracks the user's usage of the third-party application based on communications from the remote computing device, the pausable meter configured to pause when a threshold period of inactivity has been reached.

10. The computer-implemented method of claim 9, wherein the threshold period of inactivity is a user-configurable time period.

11. The computer-implemented method of claim 1, wherein the third-party application is created by the third-party software publisher, and wherein the third-party software publisher is different from an entity performing the computer-implemented method.

12. The computer-implemented method of claim 1, further comprising communicating with the shell application once per minute to verify usage of the third-party application by the user.

13. The computer-implemented method of claim 1, wherein the user's application usage account is associated with a plurality of users.

14. The computer-implemented method of claim 1, wherein the deducted amount comprises a different monetary amount per time unit based on a type of operation executed by the third-party application.

15. The computer-implemented method of claim 1, wherein the shell application provides secure communication capabilities to the third-party application.

16. The computer program product of claim 6, wherein the deducted amount comprises a different monetary amount per time unit based on a type of operation executed by the third-party application.

17. The computer program product of claim 8, wherein the shell application provides a user interface comprising a pausable meter that tracks the user's usage of the third-party application based on communications from the remote computing device, the pausable meter configured to pause when a threshold period of inactivity has been reached.

18. The computer program product of claim 8, the performed method further comprising periodically recharging the account balance when the account balance declines to a given minimum amount.

19. The computer program product of claim 8, wherein the shell application notifies the third-party application to resume a thread spawned by an operating system of the remote computing device.

20. The computer program product of claim 17, wherein the threshold period of inactivity is a user-configurable time period.

* * * * *